United States Patent
Yoon

(10) Patent No.: US 9,999,972 B2
(45) Date of Patent: Jun. 19, 2018

(54) ROBOT ARM MECHANISM AND STEPPING MOTOR CONTROL DEVICE

(71) Applicant: LIFE ROBOTICS INC., Tokyo (JP)

(72) Inventor: Woo-Keun Yoon, Tokyo (JP)

(73) Assignee: Life Robotics Inc., Tokyo (JP)

( * ) Notice: Subject to any disclaimer, the term of this patent is extended or adjusted under 35 U.S.C. 154(b) by 0 days. days.

(21) Appl. No.: 15/498,972

(22) Filed: Apr. 27, 2017

(65) Prior Publication Data

US 2017/0225327 A1    Aug. 10, 2017

Related U.S. Application Data

(63) Continuation of application No. PCT/JP2015/080355, filed on Oct. 28, 2015.

(30) Foreign Application Priority Data

Oct. 31, 2014 (JP) ................................ 2014-223821

(51) Int. Cl.
| | |
|---|---|
| *G05B 19/29* | (2006.01) |
| *B25J 9/10* | (2006.01) |
| *B25J 9/06* | (2006.01) |
| *B25J 18/06* | (2006.01) |
| *B25J 18/02* | (2006.01) |
| *H02P 8/38* | (2006.01) |
| *H02P 8/04* | (2006.01) |

(52) U.S. Cl.
CPC .............. *B25J 9/1005* (2013.01); *B25J 9/06* (2013.01); *B25J 18/02* (2013.01); *B25J 18/06* (2013.01); *H02P 8/04* (2013.01); *H02P 8/38* (2013.01); *Y10S 901/24* (2013.01)

(58) Field of Classification Search
CPC ............ B25J 9/1005; B25J 9/06; B25J 18/02
USPC ......................................................... 318/602
See application file for complete search history.

(56) References Cited

U.S. PATENT DOCUMENTS

| | | | |
|---|---|---|---|
| 6,212,968 B1* | 4/2001 | Hiruma | B25J 9/1602 74/490.03 |
| 2014/0379128 A1* | 12/2014 | Ishikawa | B25J 9/1674 700/250 |

FOREIGN PATENT DOCUMENTS

| | | |
|---|---|---|
| JP | 2000-108065 A | 4/2000 |
| JP | 2002-160176 A | 6/2002 |

* cited by examiner

*Primary Examiner* — Erick Glass
(74) *Attorney, Agent, or Firm* — Norris McLaughlin & Marcus, P.A.

(57) ABSTRACT

An object of the present invention is to prevent unnecessary driving stop of a stepping motor. A robot arm section includes a robot arm, a stepping motor 31a, a motor driver 31b, an encoder 31c and a step-out detection section 31e. The robot arm has a joint J1. The stepping motor generates power for operating the joint. The motor driver drives the stepping motor according to a target angle. The encoder outputs an encoder pulse every time a drive shaft of the stepping motor rotates by a predetermined angle. The step-out detection section detects a step-out of the stepping motor based on the target angle and a current angle of the stepping motor that is identified based on the encoder pulse. When the stepping motor does not recover from the step-out before a predetermined grace time elapses from a time at which the step-out is detected, the motor driver stops driving the stepping motor at the time point at which the grace time elapses.

10 Claims, 6 Drawing Sheets

ROBOT ARM MECHANISM AND STEPPING MOTOR CONTROL DEVICE

CROSS-REFERENCE TO RELATED APPLICATIONS

This application is continuation application of International Patent Application No. PCT/JP2015/080355 filed on Oct. 28, 2015, which is based upon and claims the benefit of priority from the prior Japanese Patent Application No. 2014-223821, filed Oct. 31, 2014, the entire contents of which are incorporated herein by reference.

FIELD

Embodiments described herein relate generally to a robot arm section and a stepping motor control device.

BACKGROUND

A stepping motor is widely used in robots and the like as a servo motor, for example. The stepping motor will become step-out when an overload is applied or a sudden speed change occurs. The term "step-out" refers to a condition whereby a pulse signal supplied to the stepping motor is not synchronized with an actual rotation of the motor. If a step-out happens, the stepping motor is not rotated to a target position. It is necessary to detect a step-out. In order to detect a step-out, an encoder is equipped with the stepping motor. Since the current position of the stepping motor can be determined based on the output of the encoder, it is possible to detect a mismatch between the target position and the current position as a step-out. Generally, when a step-out of the stepping motor is detected, the stepping motor is stopped immediately. However, for example, in a case the step-out disappears within a short time, it is sometimes better to continue the control as it is without stopping the stepping motor even if a step-out occurs.

BRIEF DESCRIPTION OF THE INVENTION

The object of the present invention is to provide a control capable of suitably operating a stepping motor after detection of a step-out.

A robot arm section according to the present embodiment comprises a robot arm including a joint;

a stepping motor configured to generate power to operate the joint;

a motor driver configured to drive the stepping motor according to a target angle;

an encoder configured to output an encoder pulse every time a drive shaft of the stepping motor rotates by a predetermined angle; and a step-out detection unit configured to detect a step-out of the stepping motor based on the target angle and a current angle of the stepping motor that is identified based on the encoder pulse, wherein when the stepping motor does not recover from the step-out before a predetermined grace time elapses from a time at which the step-out is detected, the motor driver stops driving the stepping motor at a time point at which the grace time elapses.

DETAILED DESCRIPTION OF THE INVENTION

Figure 1:
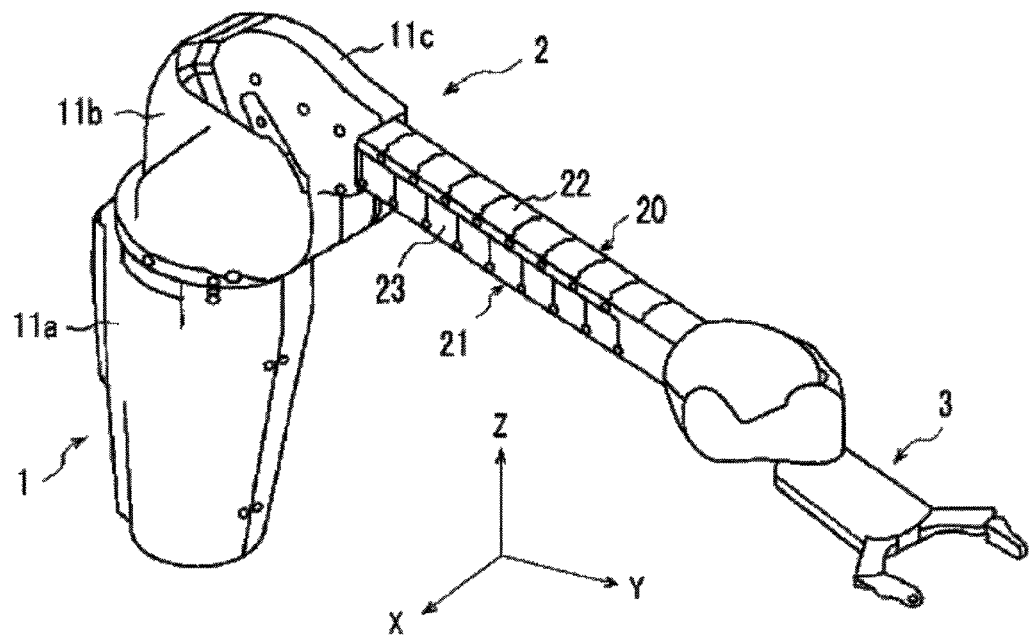
FIG. 1 is an external oblique diagram illustrating a robot arm section according to an embodiment.

Hereinafter, a robot arm section according to the present embodiment is described with reference to the accompanying drawings. In the following description, the same reference numerals denote components having substantially identical functions and structures, and the repeated description thereof is made only when necessary.

Figure 2:
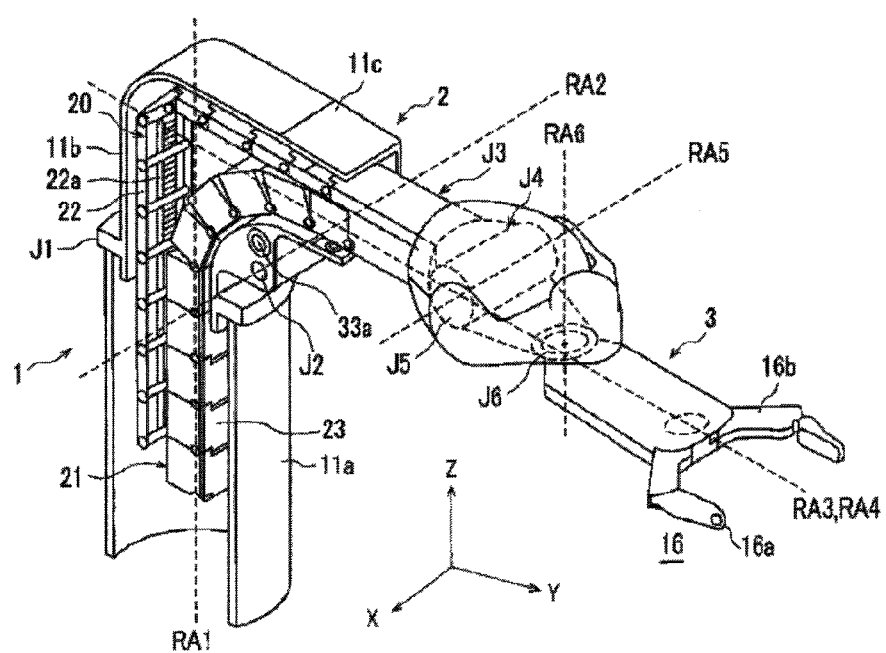
FIG. 2 is a perspective view illustrating the internal structure of the robot arm section in FIG. 1.
Figure 3:
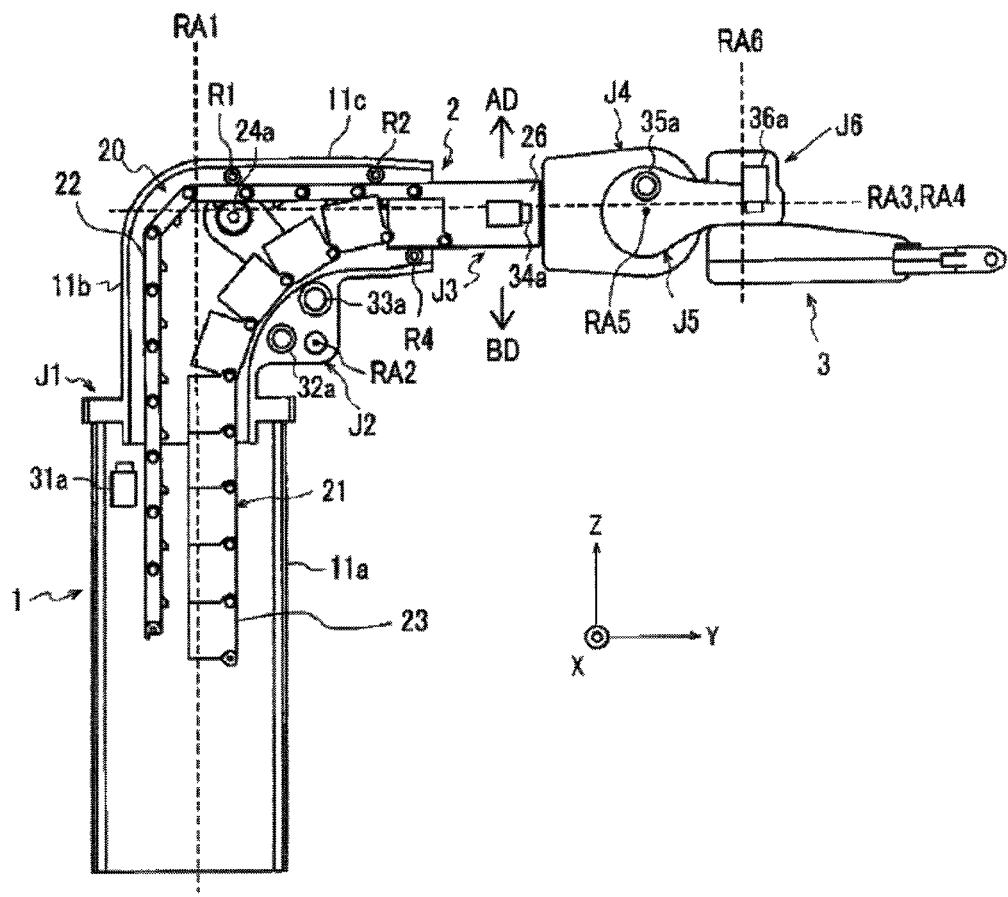
FIG. 3 is a view illustrating the internal structure of the robot arm section in FIG. 1 as viewed from a cross-sectional direction.

FIG. 1 is an external perspective view of the robot arm section according to the present embodiment. FIG. 2 and FIG. 3 are diagrams illustrating an internal structure of the robot arm section in FIG. 1. The arm section includes a substantially cylindrical base 1 and an arm section 2 connected to the base 1. A hand end-effector 3 called an end effector is attached to a tip of the robot arm section 2. In FIG. 1, a hand section capable of holding an object is shown as the hand end-effector 3. The hand end-effector 3 is not limited to the hand section, but may be another tool, a camera, or a display. At the tip of the arm section 2, an adapter which can be replaced by any type of the hand end-effector 3 may be provided.

The arm section 2 includes a plurality (herein, six) of joints J1, J2, J3, J4, J5 and J6. The plurality of the joints J1, J2, J3, J4, J5 and J6 are arranged in order from the base 1. Generally, a first axis RA1, a second axis RA2 and a third axis RA3 are called root three axes, and a fourth axis RA4, a fifth axis RA5 and a sixth axis RA6 are called wrist three axes which change the posture of the hand section 3. At least one of the joints J1, J2 and J3 constituting root three axes is a linear motion joint (a prismatic joint). Herein, the third joint J3 is the linear motion joint, particularly a joint with a relatively long extension distance. The first joint J1 is a revolute joint (a rotational joint) that rotates on the first axis of rotation RA1 which is held, for example, perpendicularly to a base surface. The second joint J2 is a bending joint (a rotational joint) that rotates on the second axis of rotation RA2 perpendicular to the first axis of rotation RA1. The third joint J3 linearly extends or retracts along the third axis (axis of movement) RA3 perpendicular to the second axis of rotation RA2. The fourth joint J4 is a revolute joint that rotates on the fourth axis of rotation RA4 which matches the third axis of movement RA3. The fifth joint J5 is a bending joint that rotates on the fifth axis of rotation RA5 orthogonal to the fourth axis of rotation RA4. The sixth joint J6 is a bending joint that rotates on the sixth axis of rotation RA6 orthogonal to the fourth axis of rotation RA4 and perpendicular to the fifth axis of rotation RA5.

The arm section 2 turns together with the hand section 3 in accordance with rotation of the first joint J1. When the stepping motor 31a rotates, the power of a drive shaft of the stepping motor 31a is transmitted to the first joint J1 via a gear (not shown). Thereby, the first joint J1 is rotated, and both the arm section 2 and the hand section 3 turn.

The arm section 2 rotates on the second axis of rotation RA2 of the second joint J2 together with the hand section 3 in accordance with rotation of the second joint J2. As shown in FIG. 3, a stepping motor 32a is arranged nearby the second joint J2. When the stepping motor 32a rotates, the power of a drive shaft of the stepping motor 32a is, for example, directly transmitted to the second joint J2. Thereby, the arm section 2 and the hand section 3 rotate around the second axis of rotation RA2 of the second joint J2. An arm support body (first support body) 11a forming the base 1 has a cylindrical hollow structure formed around the axis of rotation RA1 of the first joint J1. The first joint J1 is mounted on a fixed base (not shown). When the first joint J1 rotates, the first support body 11a axially rotates together with the turn of the arm section 2. The first support body 11a may be fixed on a ground plane. In this case, the arm section 2 turns independently of the first support body 11a. A second support body 11b is connected to an upper part of the first support body 11a.

The second support body 11b has a hollow structure continuous to the first support body 11a. One end of the second support body 11b is attached to a rotating section of the first joint J1. The other end of the second support body 11b is open, and a third support body 11c is set rotatably on the axis of rotation RA2 of the second joint J2. The third support body 11c has a scaly hollow structure communicating with the first support body 11a and the second support body 11b. In accordance with the bending rotation of the second joint J2, a rear part of the third support body 11c is accommodated in or sent out from the second support body 11b. The rear part of the third joint J3 which constitutes a linear motion joint of the arm section 2 is housed inside the continuous hollow structure of the first support body 11a and the second support body 11b by retraction thereof.

The first joint J1 includes an annular fixed section and a rotating section and is fixed to a base at the fixed section. The first support body 11a and the second support body 11b are attached to the rotating section. When the first joint J1 rotates, the first support body 11a, the second support body 11b and the third support body 11c turn around the first axis of rotation RA1 together with the arm section 2 and the hand section 3.

The third support body 11c is set rotatably, at the lower part of its rear end, on the axis of rotation RA2 with respect to a lower side of an open end of the second support body 11b. In this way, the second joint J2 serving as the bending joint that rotates on the axis of rotation RA2, is formed. When the second joint J2 rotates, the arm section 2 rotates vertically (in other words, undulates) on the axis of rotation RA2 of the second joint J2 together with the hand section 3. The axis of rotation RA2 of the second joint J2 is perpendicular to the first axis of rotation RA1 of the first joint J1 serving as a revolute joint.

As described above, the third joint J3 serving as a joint section constitutes a main constituent of the arm section 2.

The hand section 3 described above is provided at the tip of the arm section 2. Rotation, bending and extension and retraction of the first to sixth joints J1-J6 enable positioning two-fingered hand 16 of the hand section 3 at any position and posture. In particular, the linear extension and retraction distance of the third joint J3 enables the hand section 3 to act on an object in a wide range from a position close to the base 1 to a position far from the base 1.

The third joint J3 is characterized by the linear extension and retraction distance realized by a linear extension and retraction arm mechanism constituting the third joint J3. The linear extension and retraction distance is achieved by the structure shown in FIG. 2 and FIG. 3. The linear extension and retraction arm mechanism includes a first connection piece column 21 and a second connection piece column 20. In an alignment pose where the arm section 2 is horizontally positioned, the first connection piece column 21 is located below the second connection piece column 20, and the second connection piece column 20 is located on the top of the first connection piece column 21.

The first connection piece column 21 includes a plurality of first connection pieces 23 having the same U-shaped cross section and connected in a column by pins at their back surface parts. The first connection piece column 21 is bendable in its back surface direction BD but, conversely, not bendable in its front surface direction FD due to the shape of the cross section of the first connection piece 23 and connection positions by the pins. The second connection piece column 20 has a substantially flat plate shape with a width substantially equivalent to that of the first connection piece 23, and includes a plurality of second connection pieces 22 connected in a column by pins in a bendable state in both the back surface direction and the front surface direction. The first connection piece column 21 is joined to the second connection piece column 20 at the tip part by a joining piece 26. The joining piece 26 has an integrated shape of the first connection piece 23 and the second connection piece 22. When the second connection piece column 20 is sent out from the third support body 11c together with the first connection piece column 21 starting with the joining piece 26, the first connection piece column 21 and the second connection piece column 20 are jointed to each other. The first connection piece column 21 and the second connection piece column 20 are joined at their tip parts by the joining piece 26, and are each held in a jointed state at their rear part by being firmly held inside the third support body 11c and prevented from being pulled out. When the first connection piece column 21 and the second connection piece column 20 are held in the jointed state, the bending of the first connection piece column 21 and the second connection piece column 20 is restricted, whereby the first connection piece column 21 and the second connection piece column 20 constitute a columnar body having a certain stiffness. When the first connection piece column 21 and the second connection piece column 20 are separated from each other, the bending restriction is canceled, and the bendable state thereof is restored. The first connection piece column 21 and the second connection piece column 20 are joined in the vicinity of the opening of the third support body 11c and are sent out. The first connection piece column 21 and the second connection piece column 20 are separated from each other in the third support body 11c, and each become bendable. The first connection piece column 21 and the second connection piece column 20 are bent individually and accommodated in the first support body 11a as separate bodies.

As shown in FIG. 2, a linear gear 22a is formed on the inside of each of the second connection pieces 22. The linear gears 22a are connected to form a continuous linear gear when the second connection piece column 20 has a linear shape. As shown in FIG. 3, the second connection piece 22 is sandwiched between a roller R1 and a drive gear 24a inside the third support body 11c. The linear gear 22a is engaged with the drive gear 24a. As shown in FIG. 3, a stepping motor 33a is arranged nearby the second joint J2. When the stepping motor 33a rotates, the power of the drive shaft of the stepping motor 33a is transmitted to the drive gear 24a. The second connection piece column 20 is sent out from the third support body 11c together with the first connection piece column 21 by forward rotation of the drive gear 24a by the stepping motor 33a. At that time, the first connection piece column 21 and the second connection piece column 20 are sandwiched between a pair of an upper roller R2 and a lower roller R4 provided in the vicinity of the opening of the third support body 11c to, are pressed against each other, and are linearly sent out in a joined state along the third axis of movement RA3. The reverse rotation of the drive gear 24a by a motor M1 causes cancellation of the joined state of the second connection piece column 20 and the first connection piece column 21 and separation thereof in the third support body 11c behind the upper roller R2 and the lower roller R4. The separated second connection piece column 20 and first connection piece column 21 restore their bendable state, and are guided by guide rails provided inside the second support body 11b and the third support body 11c to be bent in a direction along the first axis of rotation RA1 and housed inside the first support body 11a.

The hand section 3 is provided at the tip of the arm section 2 as shown in FIG. 1. The hand section 3 is moved to a given position by the first joint J1, the second joint J2 and the third joint J3, and is positioned to take a given posture by the fourth joint J4, the fifth joint J5 and the sixth joint J6. The hand section 3 has two fingers 16a and 16b configured to be opened and closed. The fourth joint J4 is a revolute joint having the axis of rotation RA4 which typically matches a center axis of the arm section 2 along the extension and retraction direction of the arm section 2, that is, the axis of movement RA3 of the third joint J3. When the fourth joint J4 rotates, the hand section 3 rotates on the axis of rotation RA4 from the fourth joint J4 to the tip thereof. As shown in FIG. 3, a stepping motor 34a is arranged nearby the fourth joint J4. When the stepping motor 34a rotates, the power of the drive shaft of the stepping motor 34a is, for example, directly transmitted to the fourth joint J4. Thereby, the hand section 3 rotates on the axis of rotation RA4 of the fourth joint J4.

The fifth joint J5 is a bending joint having the axis of rotation RA5 orthogonal to the axis of rotation RA4 of the fourth joint J4. When the fifth joint rotates, the hand section 3 rotates up and down. As shown in FIG. 3, a stepping motor 35a is arranged nearby the fifth joint J5. When the stepping motor 35a rotates, the power of the drive shaft of the stepping motor 35a is transmitted to the fifth joint J5 via a gear (not shown). Thereby, the hand 16 rotates up and down from the fifth joint J5 to the tip.

The sixth joint J6 is a revolute joint having the axis of rotation RA6 orthogonal to the axis of rotation RA4 of the fourth joint J4 and perpendicular to the axis of rotation RA5 of the fifth joint J5. When the sixth joint J6 rotates, the hand 16 turns left and right. As shown in FIG. 3, a stepping motor 36a is arranged nearby the sixth joint J6. When the stepping motor 36a rotates, the power of the drive shaft of the stepping motor 36a is transmitted to the sixth joint J6 via a gear (not shown). Thereby, the hand 16 turns left and right.

Figure 4:
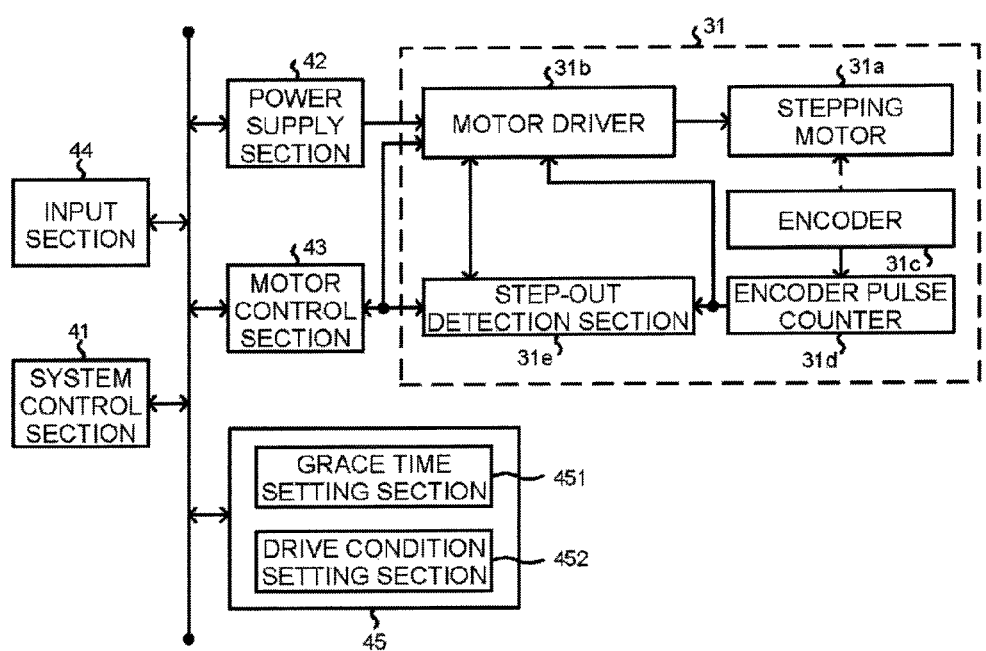
FIG. 4 is a block configuration diagram illustrating an example of the configuration of the robot arm section according to the present embodiment.

FIG. 4 is a block configuration diagram illustrating an example of the configuration of the robot arm section according to the present embodiment. The robot arm section according to the present embodiment includes the joints J1-J6. Motor drive sections 31~36 are provided in the joints J1-J6, respectively. The motor drive sections 31~36 have stepping motors 31a~36a, respectively. Herein, only the motor drive section 31 is described. The constitutions and operations of the motor drive sections 32~36 are the same as those of the motor drive section 31. A description of the motor drive sections 32~36 is omitted herein. The robot arm section includes a system control section 41, a power supply section 42, a motor control section 43, an input section 44, a setting section 45, and a motor drive section 31. The motor control section 43 and the motor drive section 31 constitute a stepping motor control device. The stepping motor control device can be applied to other devices and mechanisms that use the stepping motor as an independent device.

The system control section 41 includes a CPU (Central Processing Unit), a semiconductor memory and the like. The system control section 41 temporarily stores instruction information input to the robot arm section via the input section 44 in the semiconductor memory. The system control section 41 collectively controls each section of the robot arm section based on the input instruction information.

The power supply section 42 generates electric power to be supplied to a motor driver 31b, from a battery (not shown) loaded on the robot arm section or an external commercial power supply.

The motor control section 43 collectively controls the motor driver 31b. More specifically, the motor control section 43 outputs a signal corresponding to a condition that is set by the setting section 45, described later, to at least one of the motor driver 31b and a step-out detection section 31e. The motor control section 43 outputs a pulse control signal relating to pulse conditions that are set by a drive condition setting section 452, described later, to the motor driver 31b. The motor control section 43 outputs a current control signal concerning a maximum drive current value that is set by the drive condition setting section 452, described later, to the motor driver 31b. The motor control section 43 also outputs data relating to a grace time that is set by a grace time setting section 451, described later, to the motor driver 31b.

The input section 44 functions as an input interface for a user to input instruction information to the robot arm section. An operation device (not shown) is connected to the input section 44. For example, the operation device includes a switch for designating a joint, a joystick for designating an operation speed, an operation direction and an operation amount for rotating or linearly moving the joint and the like. The operation device is also used as an input device for setting pulse conditions, a drive current value, a grace time and the like which are described later. The user inputs movement instruction information for each joint and setting information for various conditions by operating the operation device. The robot arm section operates according to the movement instruction information. These input devices constituting the operation device can be replaced with other devices, for example, a mouse, a keyboard, a trackball, a touch panel or the like.

The setting section 45 includes the grace time setting section 451 and the drive condition setting section 452.

The drive condition setting section 452 sets the drive conditions of the stepping motor 31a. The drive condition setting section 452 can individually set the drive conditions of each of the plurality of stepping motors 31a~36a. The drive conditions include pulse conditions and a maximum allowable current value. The pulse conditions show the conditions for a pulse to be input from the motor driver 31b to the stepping motor 31a. The pulse conditions include the number of pulses, a pulse period and the like. The number of pulses relates to a rotation angle of the stepping motor 31a. For example, the drive condition setting section 452 sets a target angle of the corresponding stepping motor 31a based on the amount of rotation of the joint J1 that was input via the input section 44. Then, the number of pulses is determined based on the set target angle and a basic step angle of the stepping motor 31a. The pulse period relates to a rotation speed of the stepping motor 31a. The drive condition setting section 452 sets a pulse period for the joint J1 to rotate at an operating speed that was input via the input section 44. The maximum allowable current value is a maximum value that the motor driver 31b allows as the drive current value for driving the stepping motor 31a. The drive condition setting section 452 uses dynamics model data relating to the joint J1 to calculate a torque generated in the joint J1 based on a center of gravity position, a mass, an arm length and an inertia tensor of the arm connected to the joint J1 of the robot arm section, and a position (angle), a speed and an acceleration of the joint J1. The term "dynamics model data" refers to model data relating to dynamic characteristics of the motor. The maximum allowable current value is then determined based on the calculated torque. Thereby, determining the maximum value of the drive current value to be supplied to the stepping motor 31a based on the torque that is calculated in advance contributes to suppression of the power consumption and heating value of the stepping motor 31a. The drive condition setting section 452 may also set the drive current value for generating a torque that was input via the input section 44.

The grace time setting section 451 sets a grace time according to an instruction from the user via the input section 44. The term "grace time" refers to a time period for which the motor driver 31b postpones stopping of the driving of the stepping motor 31a after a step-out of the stepping motor 31a is detected. Therefore, unless the user inputs an instruction to stop the stepping motor 31a, stopping of the stepping motor 31a is delayed until the grace time elapses from the time at which the step-out is detected.

The motor drive section 31 has the stepping motor 31a, the motor driver 31b, the encoder 31c, an encoder pulse counter 31d, and the step-out detection section 31e. The motor drive section 31 is provided in the vicinity of the corresponding joint J1.

The motor driver 31b controls driving and stopping of the stepping motor 31a. Specifically, the motor driver 31b uses the power supplied from the power supply section 42 to generate a drive current for driving the stepping motor 31a. At this time, the drive current generated by the motor driver 31a has a current value less than or equal to the maximum allowable current value. The motor driver 31a holds data indicating the relationship between the rotation speed of the joint J1 and the optimum drive current, and generates the drive current in response to the rotation speed of the joint J1. The drive current may be set according to a torque that is indicated in an instruction which is input by the user via the input section 44.

The motor driver 31b generates a pulse (hereinafter, referred to as a "stepping pulse") in response to the pulse control signal from the motor control section 43. The stepping motor 31a rotates according to the stepping pulse generated by the motor driver 31b. When the stepping motor 31a rotates, Thereby the joint J1, which is connected to the stepping motor 31a directly or indirectly via a belt and a gear, is driven.

The motor driver 31b identifies the timing of the occurrence of a step-out and the timing of recovery from the step-out based on a step-out determination signal from the step-out detection section 31e. When the stepping motor 31a does not recover from the step-out until the time the grace time elapses from the time when the step-out of the stepping motor 31a is detected by the step-out detection section 31e, the motor driver 31b stops the generation of the stepping pulse and/or the drive current at the time point at which the grace time elapses. Herein, stopping of the stepping pulse is described as an example. As a result, driving of the stepping motor 31a is stopped.

The motor driver 31b identifies a target angle per unit time based on the pulse control signal. Data relating to the target angle per unit time is output to the step-out detection section 31e. In this case, the unit time corresponds to a control cycle of the motor drive section 31, for example. The control cycle of the motor driver 31b is shorter than the control cycle of the motor control section 43. In such a case, each component of the motor drive section 31 can operate faster under the control of the motor driver 31b as compared with a case of operating under the control of the motor control section 43.

The encoder 31c is connected to the drive shaft of the stepping motor 31a. The encoder 31c generates an encoder pulse every time a disk connected to the drive shaft of the stepping motor 31a rotates by a predetermined angle. For example, in a case where 120 slits are provided that are equally spaced in a circumferential direction of the disk, the encoder pulse is output every time the stepping motor 31a rotates three degrees. The encoder pulse is output to the encoder pulse counter 31d.

The encoder pulse counter 31d counts the number of encoder pulses that are input. The encoder pulse count information is output to the motor driver 31b and the step-out detection section 31e.

The step-out detection section 31e detects the occurrence of a step-out of the stepping motor 31a. More specifically, the step-out detection section 31e identifies a current rotation angle (hereinafter, referred to as a "current angle") of the stepping motor 31a based on the count information. The step-out detection section 31e identifies the target angle of the stepping motor 31a based on the output from the motor driver 31b. The step-out detection section 31e detects a step-out of the stepping motor 31a when the current angle and the target angle do not coincide. The step-out detection section 31e outputs the step-out determination signal for notifying the presence or absence of the occurrence of a step-out to the motor driver 31b.

Figure 5:
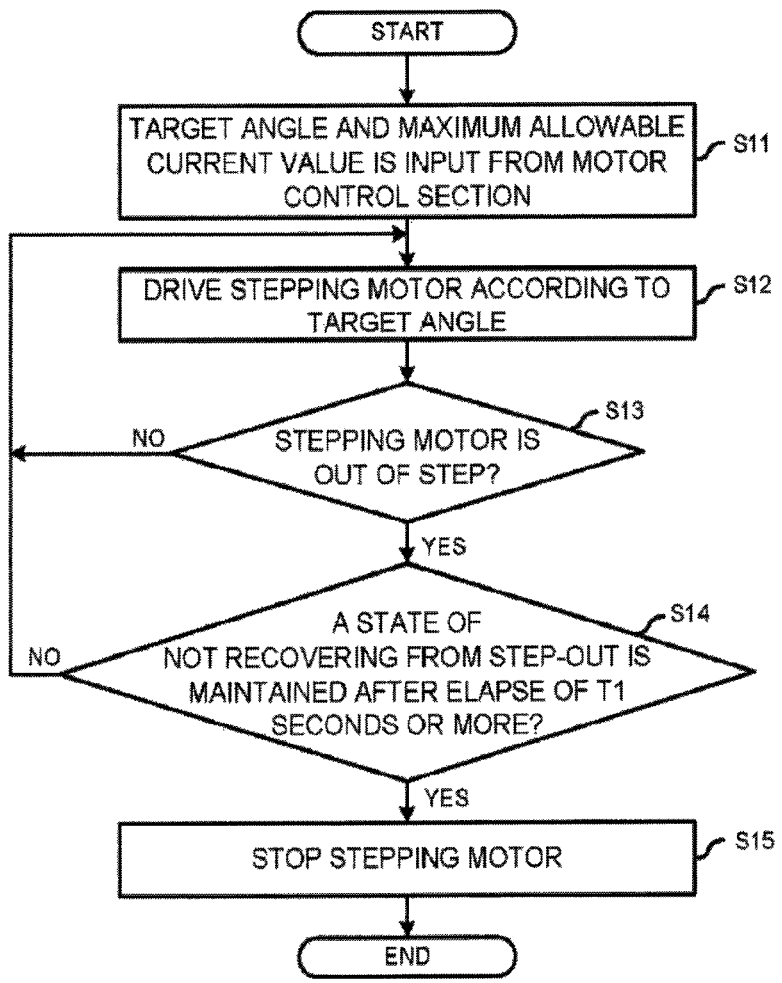
FIG. 5 is a flowchart for describing the operation of a drive unit of the robot arm section according to the present embodiment.

FIG. 5 is a flowchart for describing the operation of the drive section 31 of the robot arm section according to the present embodiment. The pulse control signal from the motor control section 43 is repeatedly input to the motor driver 31b every time a movement instruction for the respective joints is input. In the flowchart shown in FIG. 5, the operation of the drive section 31 at a time when one pulse control signal is input is described.

(Step S11) Input of the Target Angle and the Maximum Allowable Current Value

The pulse control signal and the current control signal are input from the motor control section 43 to the motor driver 31b.

(Step S12) Drive the Stepping Motor 31a

The motor driver 31b generates a stepping pulse in response to the pulse control signal, and a drive current in response to the current control signal. The stepping motor 31a is driven by the generated drive current, and the stepping motor 31a is rotated by the stepping pulse.

(Step S13) Detect Occurrence of a Step-Out of the Stepping Motor 31a

The step-out detection section 31e detects for the occurrence of a step-out of the stepping motor 31a. When the occurrence of a step-out is detected, the processing proceeds to step S14. On the other hand, when the occurrence of a step-out is not detected, the processing returns to step S12. In other words, as long as a step-out is not detected, the motor driver 31b executes normal control of the stepping motor 31a. The stepping motor 31a is rotated until the rotation angle thereof reaches the target angle.

(Step S14) Determine Whether the Stepping Motor 31a Recovers from the Step-Out within the Grace Time The elapsed time from when the step-out is first detected is measured by the motor driver 31b. When the elapsed time from detection of the step-out is less than a grace time T1, the processing returns to step S12. On the other hand, when the stepping motor 31a does not recover from the step-out before the grace time T1 elapses after the step-out is detected, the processing proceeds to step S15 upon the elapsed time reaching the grace time T1.

(Step S15) Stop the Stepping Motor 31a

The generation of the stepping pulse is stopped by the motor driver 31b. Thereby, driving of the stepping motor 31a is stopped.

According to the robot arm section of the present embodiment, the following effect is obtained. The motor driver 31b according to the present embodiment does not immediately stop driving the stepping motor 31a after a step-out of the stepping motor 31a is detected, and instead postpones stopping of the driving of the stepping motor 31a until the grace time T1 elapses. When the stepping motor 31a recovers from the step-out before the grace time T1 elapses from the time when the step-out is detected, stopping of the driving of the stepping motor 31a is avoided. Therefore, in a case where the stepping motor 31a can quickly recover from a step-out, the robot arm section according to the present embodiment can wait for the stepping motor 31a to recover from the step-out until the set grace time elapses. Therefore, the robot arm section according to the present embodiment can reduce unnecessary stopping of driving of the stepping motor 31a even after a step-out is detected. In other words, the robot arm section according to the present embodiment can provide a high level of operability to the user, and Thereby the user can operate the robot arm section in a time-efficient manner.

First Modification

The difference between a robot arm section according to a first modification and the robot arm section according to the present embodiment is that a restart switch is provided in an operation device connected to the input section 44 of the robot arm section according to the first modification. The restart switch is a switch for forcibly restarting generation of a stepping pulse that was stopped once and also restarting the supply of a drive current without turning on or off a main power supply. Therefore, the restart switch is different from a general reset button or restart button that involves the main power supply being turned on or off.

Figure 6:
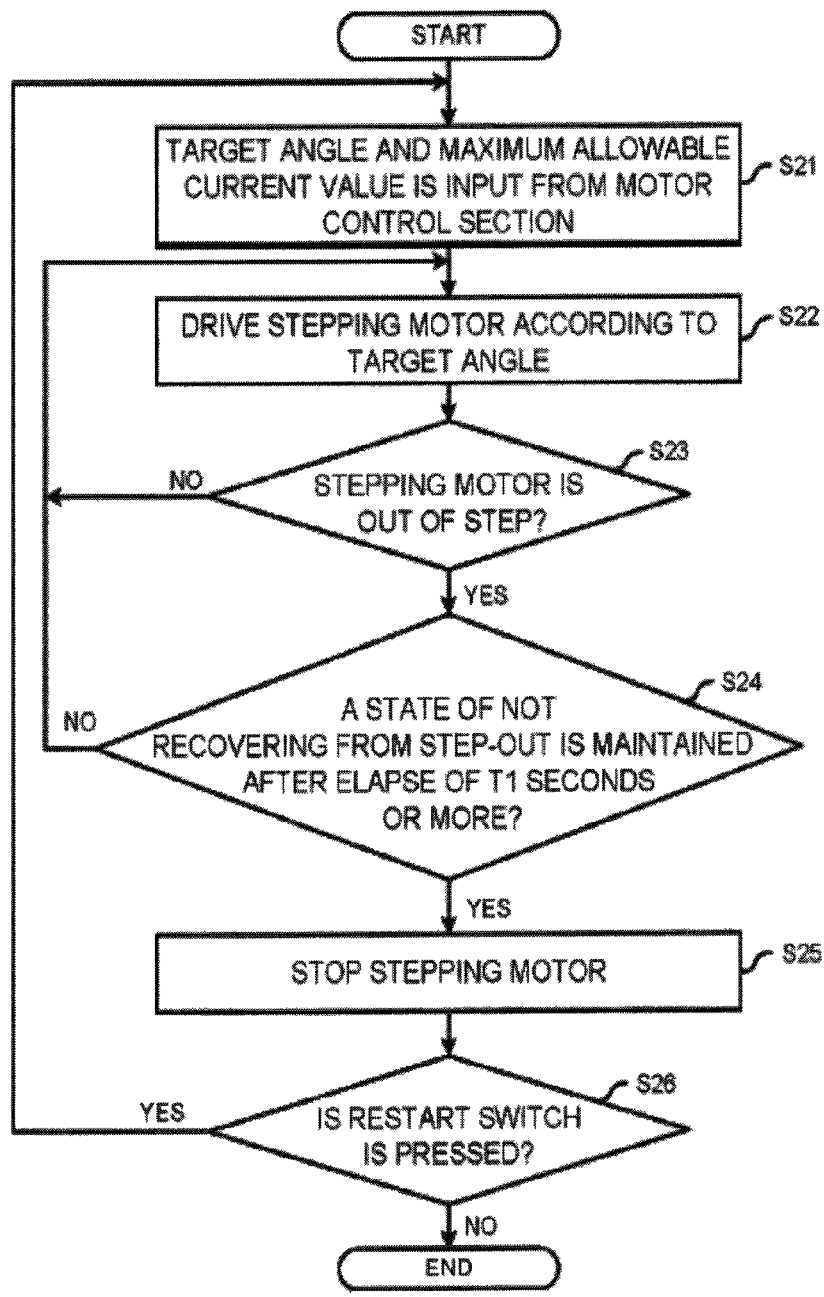
FIG. 6 is a flowchart for describing the operation of a drive unit of a robot arm section according to a first modification of the present embodiment.

FIG. 6 is a flowchart for describing the operation of the drive section 31 of the robot arm section according to the first modification of the present embodiment. In FIG. 6, similarly to the description regarding FIG. 5, the operation of the drive section 31 at a time when one pulse control signal is input is described.

(Step S21) Input of the Target Angle and the Maximum Allowable Current Value

The pulse control signal and the current control signal are input from the motor control section 43 to the motor driver 31b.

(Step S22) Drive the Stepping Motor 31a

The motor driver 31b generates a stepping pulse in response to the pulse control signal, and a drive current in response to the current control signal. The stepping motor 31a is driven by the generated drive current, and the stepping motor 31a is rotated by the stepping pulse.

(Step S23) Detect Occurrence of a Step-Out of the Stepping Motor 31a

The step-out detection section 31e detects for the occurrence of a step-out of the stepping motor 31a. When the occurrence of a step-out is detected, the processing proceeds to step S24. On the other hand, when the occurrence of a step-out is not detected, the processing returns to step S22. In other words, unless a step-out is detected, the motor driver 31b executes normal control of the stepping motor 31a. The stepping motor 31a is rotated until the rotation angle thereof reaches the target angle.

(Step S24) Determine Whether the Stepping Motor 31a Recovers from the Step-Out within the Grace Time The elapsed time from when the step-out is first detected is measured by the motor driver 31b. When the elapsed time from detection of the step-out is less than the grace time T1, the processing returns to step S22. On the other hand, when the stepping motor 31a does not recover from the step-out before the grace time T1 elapses after the step-out is detected, the processing proceeds to step S25 when the grace time T1 is reached.

(Step S25) Stop Stepping Motor 31a

The generation of the stepping pulse is stopped by the motor driver 31b. Thereby, driving of the stepping motor 31a is stopped.

(Step S26) Determine Presence or Absence of Operation of the Restart Switch

When the restart switch is pressed after driving of the stepping motor 31a is stopped, the processing is restarted from step S21. The restart switch is always enabled as long as the main power supply is not turned off, regardless of the elapsed time after driving of the stepping motor 31a is stopped. However, in order to temporarily disable the restart switch, a switch for switching the restart switch between enabled and disabled may be provided. By this means, at a time when an operator approaches the robot arm section to remove the cause of a step-out, the occurrence of a situation in which a third party mistakenly presses the restart switch and the operator is caught in the operation of the robot arm section can be prevented.

According to the robot arm section of the present embodiment, the following effect is obtained. The robot arm section according to the first modification has the restart switch. If the restart switch is pressed, the motor driver 31b can forcibly restart driving of the stepping motor 31a which stopped during operation, from the state just before operation of the stepping motor 31a stopped. After the stepping motor 31a stops, the user can perform an operation to remove the cause of the step-out, and by simply pressing the restart switch, can then continue operation of the robot arm section from the stopped state. Thereby, the robot arm section according to the first modification of the present embodiment can provide a high level of robot operability to the user.

Second Modification

The difference between the robot arm section according to the second modification and the robot arm section according to the present embodiment is that the robot arm section according to the second modification can identify the cause of a step-out when the step-out is detected, and can change the drive conditions of the stepping motor 31a according to the cause of the step-out.

Figure 7:
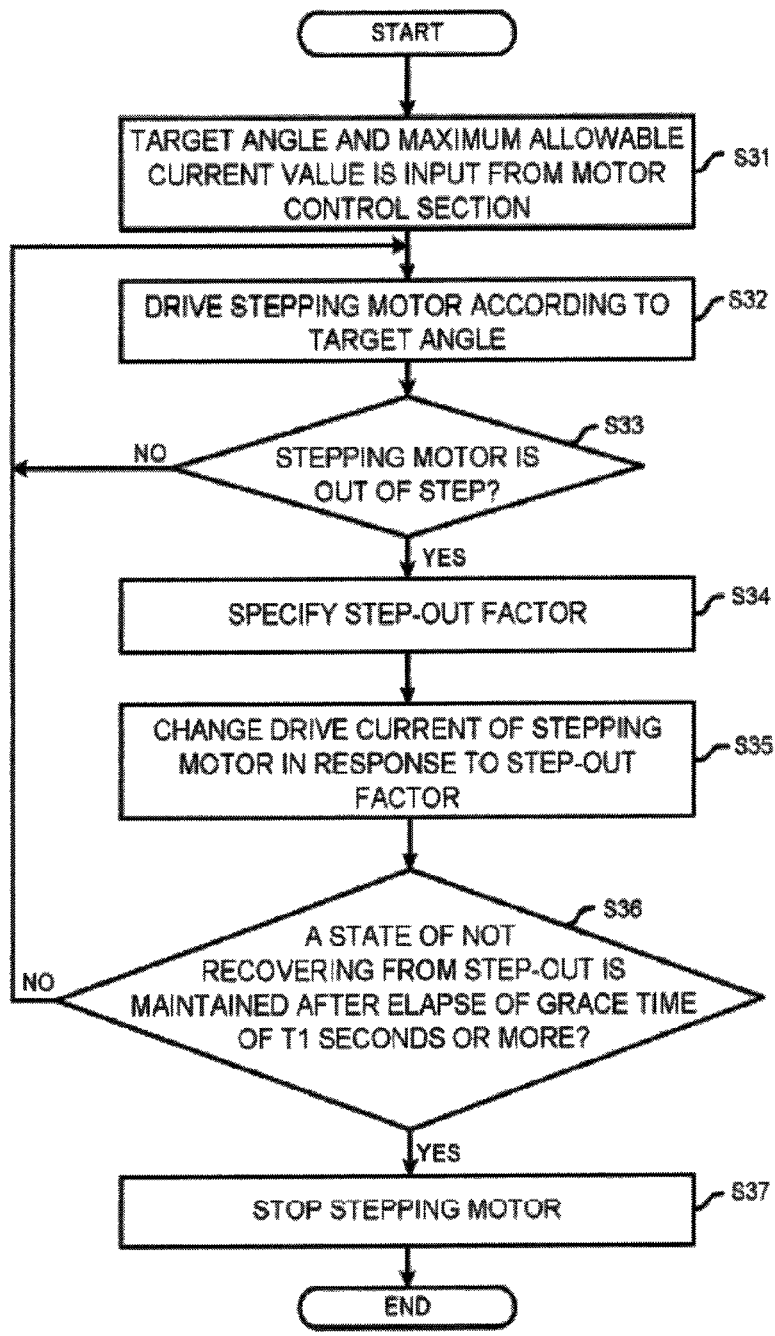
FIG. 7 is a flowchart for describing the operation of a drive unit of a robot arm section according to a second modification of the present embodiment.

FIG. 7 is a flowchart for describing the operation of the drive section 31 of the robot arm section according to the second modification of the present embodiment. In FIG. 7, similarly to the description regarding FIG. 5, the operation of the drive section 31 at a time when one pulse control signal is input is described.

(Step S31) Input of the Target Angle and the Maximum Allowable Current Value

The pulse control signal and the current control signal are input from the motor control section 43 to the motor driver 31b.

(Step S32) Drive the Stepping Motor 31a

The motor driver 31b generates a stepping pulse in response to the pulse control signal, and a drive current in response to the current control signal. The stepping motor 31a is driven by the generated drive current, and the stepping motor 31a is rotated by the stepping pulse.

(Step S33) Detect Occurrence of a Step-Out of the Stepping Motor 31a

The step-out detection section 31e detects for the occurrence of a step-out of the stepping motor 31a. When the occurrence of a step-out is detected, the processing proceeds to step S34. On the other hand, when the occurrence of a step-out is not detected, the processing returns to step S32. In other words, unless a step-out is detected, the motor driver 31b executes normal control of the stepping motor 31a. The stepping motor 31a is rotated until the rotation angle thereof reaches the target angle.

(Step S34) Identify the Step-Out Cause

The step-out cause is identified by the motor driver 31b. The causes of a step-out include internal causes and external causes. The internal causes include a phenomenon that rotation of the motor cannot conform to the stepping pulse because the torque of the stepping motor 31a is insufficient. The external causes include a phenomenon that the arm section is in contact with a person or an object and a scheduled movement cannot be made. The motor driver 31b identifies the step-out cause based on an output from a contact sensor (not shown). Specifically, when a change value of the output of the contact sensor at the timing at which the step-out is detected by the step-out detection section 31e exceeds a threshold value, the motor driver 31b identifies the step-out cause as an external cause. When the change value of the output of the contact sensor at the timing at which the step-out is detected by the step-out detection section 31e is less than the threshold value, the motor driver 31b identifies the step-out cause as an internal cause.

(Step S35) Change the Drive Condition According to the Step-Out Cause

The motor driver 31b changes the drive current value of the stepping motor 31a according to the step-out cause. For example, when the step-out cause is an external cause, the motor driver 31b lowers the drive current value. On the other hand, when the step-out cause is an internal cause, the motor driver 31b raises the drive current value. When the step-out cause is an external cause, the motor driver 31b may maintain the drive current value. The motor driver 31b may also change the grace time T1 as well as changing the drive current.

(Step S36) Determine Whether the Stepping Motor 33a Recovers from the Step-Out within the Grace Time The elapsed time since the step-out is first detected is measured by the motor driver 31b. When the elapsed time from detection of the step-out is less than the grace time T1, the processing returns to step S32. On the other hand, when the stepping motor 33a does not recover from the step-out before the grace time T1 elapses after the step-out is detected, the processing proceeds to step S37 when the grace time T1 is reached. The grace time T1 may be changed by the motor driver 31b in some cases.

(Step S37) Stop the Stepping Motor 31a

The generation of the stepping pulse is stopped by the motor driver 31b. As a result, driving of the stepping motor 31a is stopped.

According to the robot arm section of the second modification of the present embodiment, the following effect can be obtained. After a step-out of the stepping motor 31a is detected, the motor driver 31b of the robot arm section according to the second modification can change a drive condition of the stepping motor 31a according to the step-out cause. For example, a step-out that is due to an internal cause occurs due to a shortage with respect to the torque of the stepping motor 31a. In such a case, the motor driver 31b executes control to raise the drive current value of the stepping motor 31a. As a result, the torque of the stepping motor 31a increases, and there is a possibility that the stepping motor 31a can recover from the step-out that is due to the internal cause. Further, when the step-out cause is an external cause (such as a collision with a human or other interfering objects), the motor driver 31b executes control to lower the drive current value. Thereby, the torque of the stepping motor 31a is reduced and malfunction of the robot arm section, human injury, damage of objects and the like can be prevented and safety can be ensured.

The motor driver 31b may execute control to change the grace time together with a change in the drive current value. For example, in a case where the step-out cause is an external cause, by executing control to shorten the grace time, the motor driver 31b can shorten the grace time until the stepping motor 31a is stopped, and malfunction of the robot arm section, human injury, damage of objects and the like can be prevented. On the other hand, by executing control to lengthen the grace time, it is possible to lengthen the time for the stepping motor 31a to recover from the step-out, and unnecessary stopping of the stepping motor 31a can thus be reduced. In other words, whether the motor driver 31a shortens or lengthens the grace time after detection of a step-out differs according to the use situation, application and the like of the robot arm section. The drive condition and the parameters thereof to be changed after a step-out can be appropriately changed according to an instruction from the user. For example, drive conditions and the like that are alternatively changed may be determined based on intended uses and situations of the robot arm section that the user selects.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A robot arm section, comprising:
   a robot arm including a joint;
   a stepping motor configured to generate power to operate the joint;

a motor driver configured to drive the stepping motor according to a target angle;

an encoder configured to output an encoder pulse every time a drive shaft of the stepping motor rotates by a predetermined angle; and a step-out detection unit configured to detect a step-out of the stepping motor based on the target angle and a current angle of the stepping motor that is identified based on the encoder pulse, wherein when the stepping motor does not recover from the step-out before a predetermined grace time elapses from a time at which the step-out is detected, the motor driver stops driving the stepping motor at a time point at which the grace time elapses.

2. The robot arm section according to claim 1, wherein the stepping motor is prevented from stopping until the predetermined grace time elapses from a time of detection of the step-out.

3. The robot arm section according to claim 2, wherein stopping of the stepping motor is avoided when the stepping motor recovers from the step-out before the predetermined grace time elapses from a time of detection of the step-out.

4. The robot arm section according to claim 1, further comprising:

a restart operation unit; and a control unit configured to control the motor driver to restart driving of the stepping motor when the restart operation unit is operated after driving of the stepping motor is stopped.

5. The robot arm section according to claim 1, wherein the motor driver changes a drive current of the stepping motor when the step-out is detected.

6. The robot arm section according to claim 5, wherein the motor driver changes the grace time together with the drive current when the step-out is detected.

7. A stepping motor control device, comprising:

a stepping motor;

a motor driver configured to drive the stepping motor according to a target angle;

an encoder configured to output an encoder pulse every time a drive shaft of the stepping motor rotates by a predetermined angle; and a step-out detection unit configured to detect a step-out of the stepping motor based on the target angle and a current angle of the stepping motor that is identified based on the encoder pulse, wherein when the stepping motor does not recover from the step-out before a predetermined grace time elapses from a time at which the step-out is detected, the motor driver stops driving the stepping motor at a time point at which the grace time elapses.

8. The stepping motor control device according to claim 7, further comprising:

a restart operation unit; and a control unit configured to control the motor driver to restart driving of the stepping motor when the restart operation unit is operated after driving of the stepping motor is stopped.

9. The stepping motor control device according to claim 7, wherein the motor driver changes a drive current of the stepping motor when the step-out is detected.

10. The stepping motor control device according to claim 9, wherein the motor driver changes the grace time together with the drive current when the step-out is detected.

* * * * *